UNITED STATES PATENT OFFICE.

LAURENCE V. REDMAN, OF CHICAGO, ILLINOIS, ASSIGNOR TO REDMANOL CHEMICAL PRODUCTS COMPANY, OF CHICAGO, ILLINOIS, A CORPORATION OF WEST VIRGINIA.

CONDENSATION PRODUCT AND METHOD OF PREPARING SAME.

1,188,014.     Specification of Letters Patent.     Patented June 20, 1916.

No Drawing.     Application filed February 24, 1914. Serial No. 820,774.

*To all whom it may concern:*

Be it known that I, LAURENCE V. REDMAN, a citizen of the United States, residing at Chicago, in the county of Cook and State of Illinois, have invented a new and useful Condensation Product and Method of Preparing Same, of which the following is a specification.

My invention relates particularly to condensation products of phenol and substances containing the methylene radical, and methods for preparing same.

My primary object is to provide a product which is free from impurities, and further, to provide an improved process, enabling a substance of this character to be produced in an exceedingly simple manner, the process being capable of being easily practised in a commercial way and giving improved results.

An important object is to provide a practical process which will enable a compound of definite characteristics to be produced with the greatest certainty and under conditions possessing great practical advantages.

According to my improved process, I directly combine a phenolic body, such as carbolic acid, with hexamethylenetetramin by an anhydrous re-action carried on substantially in the absence of water, using an excess of phenol, that is, more phenol than can combine with the methylene present in the hexamethylenetetramin to form a final hard, insoluble, infusible product, thus obtaining, as a result of a very simple preliminary step in my process, a fusible anhydrous phenolic resin; and having obtained, by this simple preliminary step, what I may term the initial fusible product, I dissolve the initial product in, or mix it with, a substance which will furnish sufficient methylene to convert the initial product, at a proper temperature, to a final insoluble, infusible, chemically inert substance, which may be termed the final product.

By means of the improved process, I am able to convert the initial product into the final product at a comparatively low temperature and without the use of pressure; and I am able to obtain a product of great purity and possessing in the highest degree the many valuable characteristics desirable in this class of product. I am able, also, in the practice of the process, to dispense with the use of catalyzers and to avoid the necessity of removing such substances or attempting to neutralize the harmful effects of such substances in the product.

According to my preferred method, I first obtain a fusible condensation product of phenol and hexamethylenetetramin in the following manner: Mix phenol and hexamethylenetetramin in the proportions of 1 mol. of hexamethylenetetramin to 11 mols. of phenol and heat the same to a temperature of approximately 130° C. The application of heat is then discontinued, and the temperature of the mass automatically rises to approximately 140° C., when a rapid evolution of ammonia begins; the temperature of the mass continues to rise to about 180° C. with continued evolution of ammonia; when the evolution of ammonia abates, heat is again applied to keep the mass boiling at about 180° C. to 185° C., until all of the ammonia is driven off. At this stage, the substance is soluble in acetone, alcohols, dilute alkalis, phenol, and other solvents. After the nitrogen or the most of it has been driven off as ammonia, the mass is allowed to cool to a temperature of approximately 105° C., when it appears as a thick, quite viscous liquid of amber yellow color, where pure substances are used, or of darker color, if crude phenol be used.

As an illustration of the step followed in producing the fusible condensation product, the following may be stated: I may take 103 pounds carbolic acid ($C_6H_5OH$), mix the same with 14 pounds of hexamethylenetetramin ($(CH_2)_6N_4$) otherwise known as formin, heat the same to a temperature of approximately 130° C., discontinue the application of heat, allowing the mass to become automatically heated to a temperature of 180° C., with continuous evolution of ammonia after the temperature rises above 140° C.; when the evolution of ammonia abates, again apply heat and boil briskly at approximately 183° C., for such period as may be necessary to drive off the most of the nitrogen, a period of five hours usually sufficing for this operation.

The foregoing step is carried on substantially in the absence of water, and gives an anhydrous re-action. The substance may now be represented by the following formula:

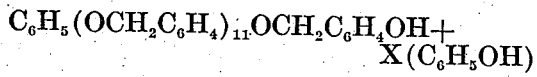
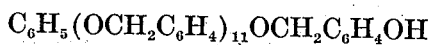

The substance will be found to contain about 62% of $$C_6H_5(OCH_2C_6H_4)_{11}OCH_2C_6H_4OH$$

(phenyl-endeka-saligeno-saligenin) and 38% of $C_6H_5OH$ (phenol).

Having produced the fusible phenolic resin which is substantially an anhydrous product without impurities, such as catalyzers or salts produced in an effort to neutralize the effects of catalyzers, I may proceed to convert the substance to the final insoluble, infusible product by either of the following steps, viz:

(a) Allow the fusible, phenolic resin to cool to about 105° C., although cooling temperatures as high as 120° C. may be employed, dissolve it in a 40% solution of formaldehyde (formalin), using 15 pounds of $CH_2O$, which would be represented by about 38 pounds (about 4.7 gallons) of the solution; mix with the resin thus dissolved about .466 pounds hexamethylenetetramin; then allow the mass to cool to, or, if necessary, maintain it at a temperature of approximately 65° C. although this temperature may vary from 75° or thereabout downward until hardening takes place.

When the fusible resin is dissolved in the manner above stated, the substance may be poured into molds and introduced into ovens and gradually dried at a temperature of approximately 65° C., the hardening taking place in the molds; and the material may be removed from the molds as soon as the hardening is accomplished. It is found that, following this method of procedure to obtain the final product, a very slight shrinkage takes place in the hardening, which facilitates removal of the substance from the mold.

(b) The step of converting the fusible resin to the final product may be carried on in the manner just described, except that instead of the .466 pound hexamethylenetetramin, there may be substituted .4 pound of solution of ammonia (28% solution).

(c) Instead of using formalin to effect the conversion to the final product, I may use 11.66 pounds of hexamethylenetetramin dissolved in a mixture of 50% alcohol and 50% water, or dissolved in formalin as a saturated solution, or in any mixture of the ordinary alcohols and water, or any mixture of alcohols and formalin, or any mixture of acetone and water, or any other suitable solvent, which, if desired, may be in pure form, such as any alcohol. The manner of effecting the conversion to the final product is similar to the step described at (a).

(d) Stop the heat while some nitrogen is still retained in the fusible resin, allow the mass to cool to 105° C., and then add a sufficient amount of a methylene compound to effect conversion of the substance to the final insoluble state, corresponding with the union of six mols. of phenol with six groups of active methylene (furnished, for instance, by 1 mol. of hexamethylenetetramin), the temperature being preferably maintained at about 65° C. while the hardening takes place. In some instances, however, as in producing steam-packings or valves, it is desirable to use a temperature approximating 180° C. in the final portion of the treatment.

In each instance, I employ, to effect the conversion to the final product, a substance which will readily furnish the necessary methylene ($CH_2$) to combine with the phenyl-endeka-saligeno-saligenin and with the free phenol which compose the fusible resin; and I may employ therewith a very slight amount of ammonia to act purely as an aid in expediting the re-actions which occur in converting the substance to the final state. In the illustrations given at (a) and (c), the slight amount of ammonia is furnished by the hexamethylenetetramin.

For certain purposes, it is desirable to avoid the use of the small amount of ammonia in effecting the conversion to the final state. In such case, the solution of formalin may be employed without the addition of hexamethylenetetramin. Following this method of effecting conversion to the final state, I am able to produce a transparent product, glass-like in appearance, or having almost water-white color, if desired.

It is to be borne in mind, generally speaking, that the color is apt to vary with the variation in the purity of the material to be used. For illustration, if one uses crude phenol, the product will have a darker color; and one may use dyes (coal tar dyes, if desired), and produce various colors. In fact, the color may vary from almost a colorless appearance to a dark amber, a dark ruby, or even a black color.

Where it is desirable to produce transparent effects, the second step of the process described at (a) is desirable; and where it is especially desirable to produce the highest grade of an insulation product, the second step in the process described at (c) is desirable, avoiding the use of any considerable percentage of water in the final step of the process.

It will be noted as a characteristic of the improved process that in the first step of the process the serious difficulties which have so long been experienced in this art by the practice of the old wet formaldehyde process, with the attendant difficulties incident to the use of large quantities of water and necessary catalyzers during this stage of producing a phenolic condensation product, are entirely obviated; and at the end of the first step of the process, the product is left in a sufficiently mobile state to render easy the succeeding step of converting the substance to the final infusible state. Not only so, but the method followed renders it possible to eliminate the ammonia in the easiest possible manner, producing a fusible, anhydrous resin, which requires no other treatment than that of permitting cooling preparatory to introducing the methylenes necessary to effect the conversion to the final state, and finally gives a product of the greatest purity.

It is to be noted that the proportions may be varied somewhat. For illustration, I may state that in the first step of the process I have demonstrated that with 1 mol. of hexamethylenetetramin I may use phenol ranging from approximately 9 mols. to approximately 13 mols., but 11 mols. give the best result. Again, while it is preferred to use practically pure materials, it may be necessary commercially to use the commercially obtainable ingredients. Thus, the phenol may, without great detriment, contain a small amount of water, say in the neighborhood of 5%. As indicated, however, the anhydrous material is desirable.

It thus will be seen that in the first step of the process I re-act upon a phenolic body with an anhydrous methylene body, compounded in the proportions affording more than 1 phenol group to one methylene group. Indeed, within the lowest limit of the range within which I have practised the improved process, I employed approximately 1½ phenol groups to an active methylene group, while within the highest limit I use more than two phenol groups to one active methylene group. In producing the final product for insulation purposes, I may, preparatory to the final step of the process, introduce fillers, such as kieselguhr, ground silica, powdered slate, stone, asbestos, wood fiber, cellulose, or the like.

It is an especially valuable feature of the process that the conversion of the fusible resin to the final infusible state can be effected at low temperature and without the use of pressure. This is highly desirable for many purposes, and is peculiarly desirable when the product is to be used as a coating, or as a varnish, particularly when applied to articles which may be injured by heating at high temperature, or by prolonged heating. In the practice of the final step of the process, the material may be applied as a coating, and the drying may be effected at low temperature, the conversion to the final product being effected during the drying process.

Instead of using carbolic acid, one may employ a homologue, such as the cresols, or any other suitable commercially obtainable phenolic body. So also, any substance which will serve as a substitute for the hexamethylenetetramin to supply the methylene in an anhydrous re-action carried on in the absence of water, may be employed in the first step of the process.

It may be stated here that hexamethylenetetramin is a methylene-amin derivative, containing both the methylene group and nitrogen, or the constituents of ammonia. The use of such a derivative is desirable in producing the anhydrous fusible resin in the first step of the process herein described.

In the practice of the first step of the process, the ammonia evolved may be collected and discharged into a solution of formaldehyde to produce fresh hexamethylenetetramin; and this, in turn, may be used in the practice of the process. The initial product may be rapidly and economically produced; and the final product may be produced under the most advantageous conditions. The final product corresponds, as nearly as can be determined, with a union of 1 mol. of hexamethylenetetramin to 6 mols. of phenol.

It may be added that while it is preferred to allow the material to cool somewhat after the first step of the process, with a view to securing a more quiescent re-action in the second step of the process, nevertheless the second step of the process may be proceeded with without first allowing the material to cool; and it may be stated generally that the application of heat may be regulated throughout to secure the best results for the particular purpose in view. The feature of producing the first anhydrous soluble resin by anhydrous re-action between a phenolic body and a methylene body compounded in proportions to leave a comparatively large amount of free phenol in the resin, and finally adding a methylene body in sufficient quantity to convert the soluble product to the final insoluble state, is one of the utmost importance, but capable, nevertheless, of being carried out with a considerable range of variation in specific details, as the foregoing examples serve to indicate. Moreover, variations in the details of the process are desirable, depending upon the exact character of the product desired, as will be understood from the foregoing description.

The foregoing detailed description has been given for clearness of understanding only, and no unnecessary limitation should be understood therefrom, but the appended claims should be construed as broadly as permissible in view of the prior art.

What I regard as new and desire to secure by Letters Patent is—

1. In the process of producing a phenolic condensation product, the step which consists in mixing a phenolic body and an active methylene body in the proportions of considerably more than 1 phenol group to each active methylene group of the methylene body; and subjecting the same to the action of heat substantially in the absence of water and causing an anhydrous reaction, to produce a fusible phenolic resin.

2. In a process of producing a phenolic condensation product, the step which consists in mixing a phenolic body and hexamethylenetetramin in the proportions of considerably more than 1 phenol group to 1 methylene group; heating the mixture substantially in the absence of water to a temperature of approximately 130° C. to cause an anhydrous reaction; substantially discontinuing the application of heat and allowing the temperature of the mass to rise to approximately 180° C. with the evolution of ammonia; and applying further heat when the evolution of ammonia abates, the application of heat being continued and the temperature maintained at approximately 180° C. till the most of the nitrogen is driven off from the mass.

3. In a process of producing a phenolic condensation product, the step which consists in mixing a phenolic body and hexamethylenetetramin in the proportions of considerably more than 1 phenol group to 1 methylene group; heating the mixture substantially in the absence of water to a temperature of approximately 130° C. to cause an anhydrous reaction; substantially discontinuing the application of heat and allowing the temperature of the mass to rise to approximately 180° C. with the evolution of ammonia; applying further heat when the evolution of ammonia abates, the application of heat being continued and the temperature maintained at approximately 180° C. till substantially all of the nitrogen is driven off from the mass; and allowing the mass to cool to a temperature of approximately 105° C.

4. The process of producing an infusible, insoluble condensation product, which consists in combining hexamethylenetetramin with a phenolic body by an anhydrous reaction in substantially the absence of water, the materials being used in the proportions of considerably more than 1 phenol group to 1 methylene group, the substance being initially heated to a degree sufficient to cause automatic heating of the mass to take place; allowing the automatic heating to continue, while the external heating is abated, until the evolution of ammonia abates; then applying external heat to drive off most of the remaining nitrogen; then cooling the mass to a temperature below 120° C.; then converting the mass to the final insoluble infusible product by introducing a substance containing methylene in sufficient quantity to effect such conversion.

5. In the process of producing a phenolic condensation product, the step which consists in compounding a phenolic body and hexamethylenetetramin in the proportions of considerably more than 1 phenol group to 1 methylene group of the hexamethylenetetramin; artificially heating the mixture substantially in the absence of water to a temperature approximating 130° C.; allowing the temperature of the mass to be automatically raised to about 180° C., with evolution of ammonia, the artificial heat being abated during this period; applying further artificial heat when the evolution of ammonia abates, and boiling the mass briskly for a prolonged period, thereby driving off the most of the remaining nitrogen, thus obtaining phenyl-endeka-saligeno-saligenin with a free phenol incorporated therein.

6. The process of producing a fusible condensation product, which consists in compounding a phenolic body and hexamethylenetetramin in the proportions to afford at least substantially 1½ phenol groups to 1 methylene group; heating the mixture sufficiently to cause automatic heating to occur; abating the application of heat and allowing the mass to rise in temperature to approximately 180° C., with evolution of ammonia; and applying further heat, when the evolution of ammonia abates, to drive off most of the remaining nitrogen in the product.

7. The process of producing an insoluble, infusible condensation product, which consists in compounding a phenolic body and hexamethylenetetramin in proportions to afford more than 1½ phenol groups to 1 methylene group; raising the temperature by heat from an external source to such a point that automatic heating will occur; abating the heat from the external source while automatic heating continues with evolution of ammonia; applying more external heat when the evolution of ammonia abates, and maintaining the temperature at about 180° C. for a prolonged period till most of the remaining nitrogen is driven off; allowing the product to cool; and finally introducing a substance containing sufficient methylene to convert the product to the final infusible, insoluble state, and effecting such conversion at a still further reduced temperature.

8. In the process of producing an infusible condensation product, the steps which consist in combining, by anhydrous re-action in substantially the absence of water, a phenolic body, and an active methylene body, containing nitrogen, compounded in proportions of more than 1½ phenol groups to 1 methylene group, sufficient external heat being applied to drive off substantially all the nitrogen or the mixture, thus producing a fusible, condensation product containing more than 25% of free phenol; cooling the fusible resin to a point below 120° C.; and incorporating with the cooled resin a substance containing sufficient methylene to convert the resin to the final insoluble state.

9. The process of producing an infusible condensation product, which consists in combining, by an anhydrous re-action in substantially the absence of water, a phenolic body, and a methylene-amin body, compounded in proportions of more than 1½ phenol groups to 1 methylene group, sufficient external heat being applied to drive off substantially all the nitrogen of the mixture, thus producing a fusible condensation product containing more than 25% of free phenol; cooling the fusible resin to a point below 120° C.; incorporating with the cooled resin a substance containing sufficient methylene to convert the resin to the final insoluble state and slowly cooling the product; and applying further heat at comparatively low temperature till conversion to the final state is effected.

10. In the process of producing an insoluble, infusible condensation product, the steps which consist in compounding a phenolic body and hexamethylenetetramin in proportions which will furnish considerably more than 1 phenol group to 1 methylene group; applying external heat sufficient to substantially drive off the nitrogen and produce a fusible condensation product containing free phenol; allowing the mass to cool to a point below 120° C.; and introducing ingredients containing a small amount of nitrogen and a sufficient large quantity of a methylene-carrying body to convert the product to the insoluble state.

11. The process of producing an insoluble, infusible condensation product, which consists in compounding a phenolic body and hexamethylenetetramin in proportions which will furnish considerably more than 1 phenol group to 1 methylene group; applying external heat sufficient to substantially drive off the nitrogen and produce a fusible condensation product containing free phenol; allowing the mass to cool to a point below 120° C.; introducing ingredients containing a small amount of nitrogen and a sufficiently large quantity of a methylene-carrying body to convert the product to the insoluble state; and heating the product at a relatively low temperature till the conversion to the final state is effected.

12. The process of producing an infusible, insoluble condensation product, which consists in re-acting on a phenolic body with hexamethylenetetramin, taken in proportions affording at least one and one-fourth phenol group to 1 methylene group, applying sufficient heat to drive off most of the nitrogen, thus producing a fusible condensation product containing more than 25% free phenol; and finally introducing a substance containing sufficient methylene groups to convert the fusible resin to the final infusible product and causing the conversion to the final product to take place at a temperature below 75° C.

13. The process of producing an infusible, insoluble condensation product, consisting in causing an anhydrous re-action substantially in the absence of water, between a phenolic body and an anhydrous methylene body containing an amin group in proportions furnishing considerably more than 1 phenol group to 1 active methylene group; applying sufficient heat to substantially drive off the ammonia, thus producing an anhydrous, fusible resin; lowering the temperature of the resin, and dissolving the resin in a solution of formaldehyde; and drying and hardening the product.

14. The process of producing an infusible, insoluble condensation product, consisting in causing an anhydrous re-action substantially in the absence of water between a phenolic body and an anhydrous methylene body containing an amin group in proportions furnishing more than 1 phenol group to 1 active methylene group; applying sufficient heat to substantially drive off the ammonia, thus producing an anhydrous, fusible resin; lowering the temperature of the resin and dissolving the resin in a solution of formaldehyde; introducing a small percentage of hexamethylenetetramin; and drying and hardening the product.

15. In the process of producing a phenolic condensation product, the step which consists in mixing a phenolic body and a methylene-amin derivative in the proportions of considerably more than one phenol group to each active methylene group of the methylene-amin derivative; and subjecting the same to the action of heat substantially in the absence of water and causing an anhydrous reaction, to produce a fusible phenolic resin.

16. As a new composition of matter, the fusible, anhydrous resinous condensation product containing a high percentage of free phenol and produced by combining in an anhydrous re-action, substantially in the absence of water, an active methylene body and a phenolic body in proportions furnishing considerably more than 1 phenol group to 1 active methylene group.

17. In the art of producing condensation products, the process of producing an intermediate fusible product, which consists in compounding a phenolic body and hexamethylenetetramin, substantially in the absence of water, in such proportions as to afford at least 1½ phenol groups substantially to one methylene group; and heating the mixture and driving off the most of the nitrogen in the form of ammonia.

18. The process of producing an infusible condensation product, which consists in combining, by anhydrous re-action in substantially the absence of water, a phenolic body and hexamethylenetetramin compounded in proportions of at least 1½ phenol groups to one methylene group; applying sufficient heat to drive off most of the nitrogen, thus producing a fusible condensation product containing more than 25% of free phenol; and incorporating with the fusible resin a substance containing sufficient methylene groups to convert the resin into the final insoluble state, and continuing the heat treatment until the insoluble product results.

19. The process of producing an infusible, insoluble condensation product, which consists in re-acting on a phenolic body with hexamethylenetetramin in an anhydrous re-action, said bodies taken in proportion affording at least one and one-fourth phenol groups to 1 methylene group, applying sufficient heat to drive off most of the nitrogen, thus producing a fusible condensation product containing more than 25% free phenol; and finally introducing a substance containing sufficient methylene groups to convert the fusible resin to the final insoluble product and continuing the heat treatment until the infusible product results.

LAURENCE V. REDMAN.

In presence of—
  A. C. FISCHER,
  NELLIE B. DEARBORN.